March 3, 1953 — W. B. EWING — 2,630,170
MEANS FOR ANCHORING SCREENING
Filed March 12, 1951
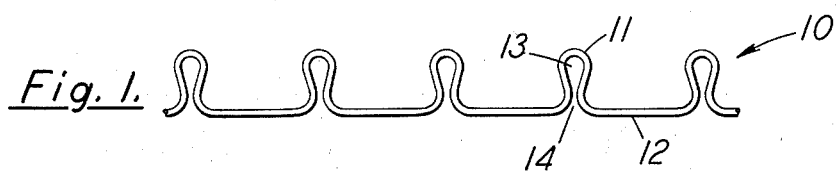
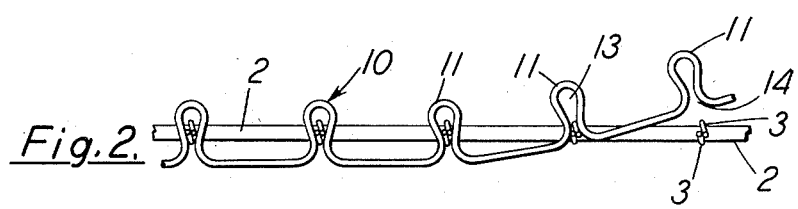
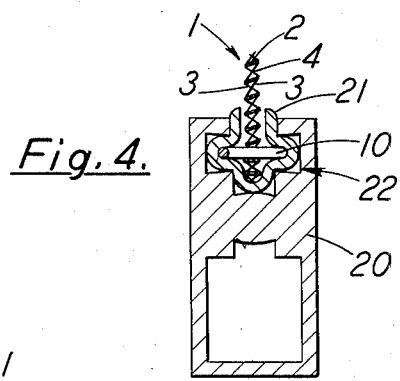
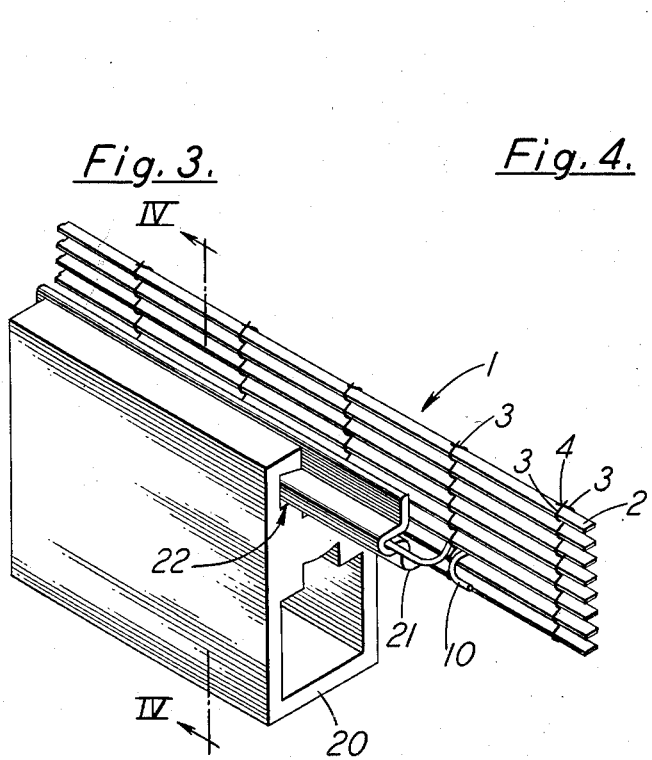
Inventor
Walkley B. Ewing
By Peter P. Price
Attorney Patented Mar. 3, 1953

2,630,170

UNITED STATES PATENT OFFICE 2,630,170

MEANS FOR ANCHORING SCREENING

Walkley B. Ewing, Grand Rapids, Mich., assignor to Ewing Development Company, Grand Rapids, Mich., a corporation of Michigan Application March 12, 1951, Serial No. 215,107

1 Claim. (Cl. 160—392)

This invention relates to screen and frame assemblies and more particularly to a novel fastener for retaining the screen within its supporting frame.

The framing of sun screen material of the type shown in Patents 2,078,940 of May 4, 1937, and 2,194,222 of March 19, 1940, presents many difficult problems which are not encountered in the framing of standard insect screen. These difficulties arise from the fact that sun screen is made up of louvers having substantial width and, therefore, it is not adaptable without injury to being frictionally clasped or splined between two surfaces as may readily be done with conventional insect screen. Furthermore, sun screen is resilient, parallel to its warp members and, must be subjected to substantial tension in order to provide a neat, straight panel.

The difficulties encountered have, in part, been overcome by the use of a sinuous lacer element of the type shown in Patent 2,270,423 of January 20, 1942. This type of lacer element provides a satisfactory anchor for the screen once it is seated in the channel of the frame. However, this lacer element is difficult to install. It is necessary to mount such a lacer element in the screen before the screen is placed in the frame channel. Since the lacer element has no means by which it can be anchored to the screen, it is very difficult to retain the lacer element in proper position while the screen is being seated in its frame. Frequently, the operator has to resort to twisting one or more of the loops to retain the lacer while the screen is being placed under tension in the frame.

My invention overcomes this difficulty by providing a lacer which may be readily mounted on the screen, but which, once mounted, will not become detached from the screen without an operator deliberately removing it.

Another difficulty encountered in existing lacer constructions is the fact that they provide a substantial portion of their bearing on the screen louver at points substantially removed from the warp wires. Since the louvers are made of very thin material and only the warp wires carry the longitudinal tension load, this tends to distort the screen in the area of the lacer and to permit the screen to spring back, releasing a portion of its tension. My invention overcomes this difficulty by anchoring the screen immediately adjacent the warp wires where the louver is given its most substantial support.

It is therefore a primary object of my invention to provide a lacer for combination sun and insect screen material which is readily attachable to the screen and which will not become detached from the screen without the aid of the operator.

It is a further object of my invention to provide a lacer for combination sun and insect screen material which will not distort the screen where the screen is anchored to the frame.

These and other objects and advantages of my improved screen lacer will be immediately seen by those acquainted with the installation of combination sun and insect screening upon reading the following specification and the accompanying drawings.

In the drawings:

Figure 1 is a fragmentary, enlarged view of my improved screen lacer.

Figure 2 is a fragmentary, enlarged view of my improved screen lacer showing it in the process of being mounted upon the screen.

Figure 3 is a fragmentary, oblique view of a length of sun screen mounted in a frame by means of my improved screen lacer.

Figure 4 is a sectional, elevation view taken along the plane IV–IV of Figure 3.

In executing the objects and purposes of my invention, I have provided a lacer for anchoring combination sun and insect screen, which lacer consists of a sinuous element having a plurality of spaced loops. Each of the loops is so spaced that it will seat closely around one of the pairs of warp wires of the screen structure. Each of the loops is provided with a narrow opening, slightly smaller than the warp wires whereby the warp wires, once seated in the loop, will not readily pass through this opening.

Referring now to the drawings in detail, the numeral 1 indicates a portion of a panel of combination sun and insect screen. The panel consists of a plurality of closely spaced, ribbon-like louvers 2 secured at spaced intervals by a pair of warp wires 3. Between each of the louvers 2, the warp wires 3 are interwound to provide an integrating knot 4. The pairs of warp wires 3 are spaced along the louvers 2 at suitable intervals such as one-half inch.

The lacer element 10 is a sinuous wire having a plurality of loops 11 separated by straight sections 12. The loops 11 are spaced apart a distance equal to the spacing between the pairs of warp wires 3. All of the loops 11 lie in the same plane and extend outwardly from the axis of the straight sections 12 in the same direction. Each of the loops 11 consists of an inner pocket 13 and a neck defining a narrow aperture 14 communicating with the pocket 13. The aperture 14 is slightly smaller than the integrating knot 4 of the warp wires 3, whereby it must be opened slightly to permit the warp wires 3 to pass through it.

The lacer element 10 may be made of any suitable material such as steel, bronze, aluminum or plastic. It must have sufficient strength to retain the screen panel 1 under tension without becoming distorted. It must also have a certain amount of resiliency whereby it may be bent during installation without permanent distortion. The lacer unit must be resistant to the effects of exposure to exterior weather conditions.

*Operation*

The screen panel 1 is first cut to the proper length. A section of lacer element 10, having a length equal to the width of the screen panel 1, is then mounted at both the upper end and the lower end of the screen panel. The width of the lacer element 10 is substantially greater than the thickness of the screen whereby, when mounted, it projects a substantial distance beyond each face of the screen.

To mount the lacer element 10 to the screen panel 1, the first loop 11 of the lacer element is pressed over the first pair of warp wires 3. Due to the resiliency of the lacer element 10, the aperture 14 will open sufficient to admit the warp wires 3 into the pocket 13 and close behind the warp wires 3 to lock them within the pocket 13. The remainder of the lacer element 10 is then bent away from the screen panel 1 in a manner to spread the apertures 14 of each of the succeeding loops 11. In this bent or curved position the lacer element 10 is pushed into place on the screen panel, one loop at a time. Each of the apertures 14 closes immediately after the warp wires 3 have been received into the pockets 13. The lacer element 10, once in place will not become detached from the screen panel 1 because each loop 11 acts as a separate anchor. Thus, the operator may proceed to secure the screen panel 1 to the screen frame 20 without the necessity of holding the lacer element in place while so doing.

If it is desired to remove the lacer element, the steps described above for installing the lacer element 10 are merely reversed. One of the end loops 11 is forced to disengage the warp wires 3. Thereafter the lacer element is bent outwardly from the screen panel to successively open each of the apertures 14 whereby the loops 11 are, one by one, disengaged from the screen panel 1.

When the lacer element 10 is in place, the loops 11 engage the screen panel 1 closely adjacent each of the pairs of warp wires 3. These loops bear against one of the louvers 2 under the pull of the screen. Since the loops are small, the points of contact between the loops 11 and the louvers 2 are all close to the louver supporting warp wires 3. Thus, there is little tendency for the louvers 2 to bend under loads imposed by the tensioned resilient screen against the restraint of the lacer element 10. This materially reduces distortion of the screen panel and improves the anchorage of the screen panel to the frame.

When the lacer element 10 is in place, it is covered by a sheath 21. The sheath 21 is made of rubber or plastic and serves as a resilient filler to tightly secure the lacer element 10 in the channel 22 of the frame 20. The lacer element 10 and sheath 21 may be attached to the frame 20 either by clamping the frame 20 about them or by sliding them longitudinally into the channel 22 from one end of the frame.

It will be recognized that the sheath 21 may be dispensed with and the lacer element 10 caused to directly engage the walls of the channel 22. The frame 20 may be fabricated from any of the conventional materials used for screen frame structures. Only one particular form of the frame is shown because each of the numerous usable forms of the frame are conventional and further detail is not believed necessary.

Modifications of my invention may be made each without departing from the principle of my invention. Each of these modifications is to be considered as included in the hereinafter appended claim unless this claim by its language expressly states otherwise.

I claim:

In combination a screen having a plurality of closely spaced louvers and warp wires at spaced intervals for supporting said louvers in position and means comprising: an elongated, resilient, sinuous element having a plurality of loops for engaging said warp wires, each of said loops spaced apart a distance equal to the spacing between said warp wires; straight portions between each of said loops, all of said straight portions aligned in tandem; each of said loops being to the same plane and extending outwardly from said straight portions in the same direction; each of said loops defining a tear drop shaped pocket having an aperture adjacent said straight portions, said apertures being of lesser width than the thickness of said warp wires and communicating with the pointed end of said pockets, said loop surrounding said warp wires.

WALKLEY B. EWING.

REFERENCES CITED

The following references are of record in the file of this patent:

UNITED STATES PATENTS

| Number | Name | Date |
|---|---|---|
| 156,500 | Robinson | Nov. 3, 1874 |
| 714,130 | Becker | Nov. 25, 1902 |
| 2,270,423 | Ewing | Jan. 20, 1942 |

FOREIGN PATENTS

| Number | Country | Date |
|---|---|---|
| 92,924 | Germany | Aug. 5, 1897 |